No. 761,457. PATENTED MAY 31, 1904.
J. T. DICKEY & C. D. DERRY.
TIRE FASTENING DEVICE.
APPLICATION FILED AUG. 19, 1903.
NO MODEL.
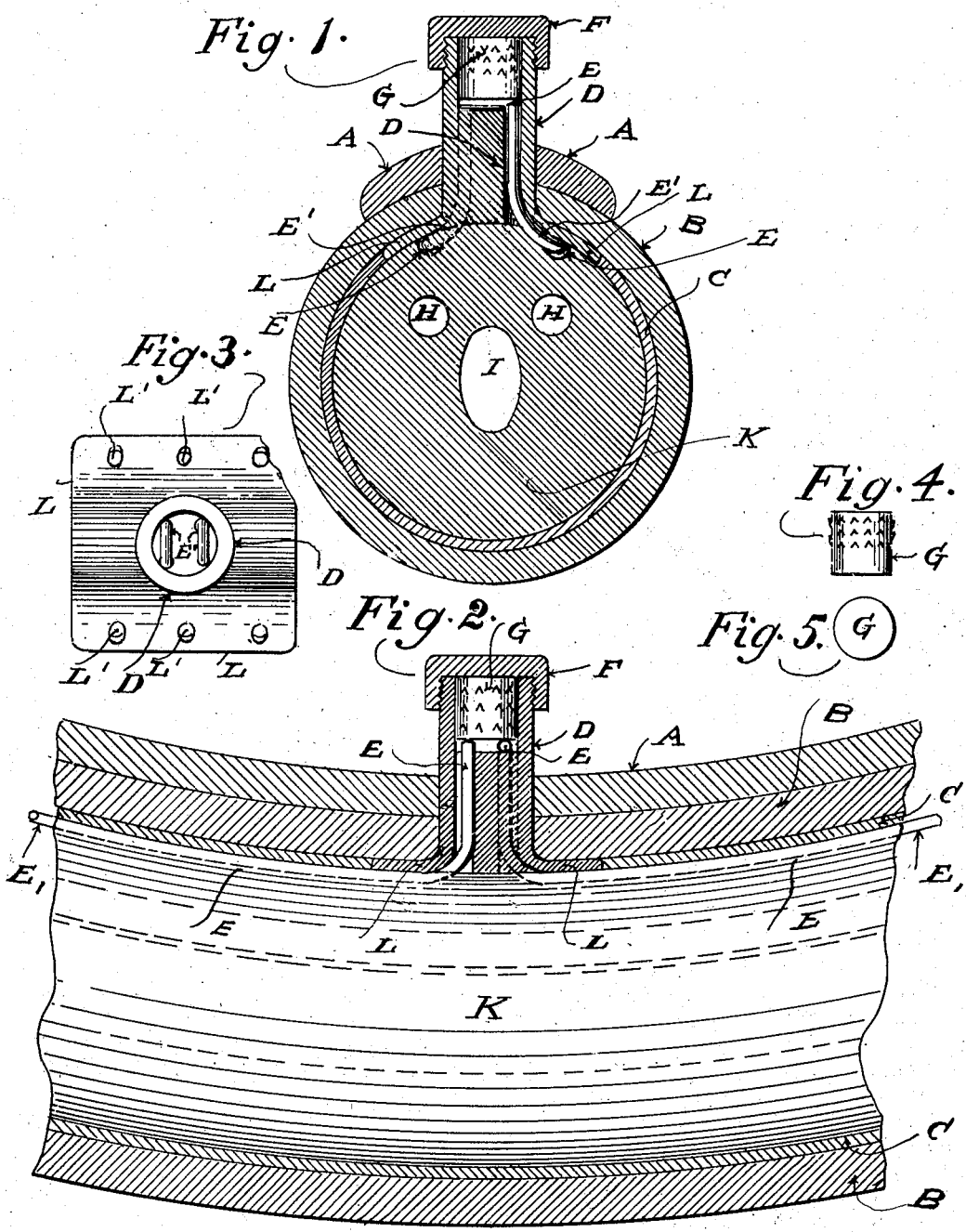
WITNESSES:
Cecilia M. Tschinkel.
Antonia Tschinkel.
INVENTORS
John T. Dickey
Carry D. Derry
BY
Alfred Tschinkel
ATTORNEY No. 761,457. Patented May 31, 1904.

UNITED STATES PATENT OFFICE.

JOHN T. DICKEY AND CARRY D. DERRY, OF BARBERTON, OHIO.

TIRE-FASTENING DEVICE.

SPECIFICATION forming part of Letters Patent No. 761,457, dated May 31, 1904.

Application filed August 19, 1903. Serial No. 170,070. (No model.)

*To all whom it may concern:*

Be it known that we, JOHN T. DICKEY and CARRY D. DERRY, citizens of the United States, and residents of Barberton, in the county of Summit and State of Ohio, have invented certain new and useful Improvements in Tire-Fastening Devices, of which the following is a specification.

Our invention relates to new and useful improvements in tire-fastening devices for bicycles, tricycles, carriages, automobiles, and like vehicles; and the objects of our invention are, first, to afford facilities for a proper fastening of the tire to its rim; second, to control the fastening of a tire from one fixed point on the rim, securing a tight connection between said parts equally divided over the touching surface portions. We attain these objects by the mechanism illustrated in the accompanying drawings, in which—

Figure 1 is a cross-section of a tire, showing our new fastening device. Fig. 2 is a longitudinal section of the same. Fig. 3 is a top view of a flanged cylindrical tube, a receptacle for the ends of a wire. Fig. 4 is a side view of a cylindrical plug adapted to tightly secure the ends of a wire to the inside of a cylindrical tube. Fig. 5 is a top view of the same.

Similar letters refer to similar parts throughout the several views.

A cylindrical core K of a tire is provided with longitudinal perforations or openings H H I of any desired shape and number. The extreme inner circle of said core K is provided with a groove E, forming a receptacle for a wire E', of tempered steel or any other suitable material, which has its ends guided through perforations in a cylindrical tube D and secured therein by means of a corrugated plug G. A cap F may be adapted to close the upper portion of said tube D, whereas the lower portion terminates in the form of a curved flange L, provided with perforations L' and secured to the core K by means of layers of canvas C and rubber B. The wire E', practically embedded in said core K, encircled by rubber and canvas, has its ends extending through a flanged tube D and when pulled outwardly will secure the tire tightly to its rim A, after which the ends may be bent and non-removably secured to the inside of said tube D by means of a corrugated cylinder or plug G.

One or more wires may be used to fasten the tire to its rim A, all to be arranged in a manner similar to that described.

What we claim as our invention, and desire to secure by Letters Patent, is—

1. In a tire-fastening device the combination of a tire having a longitudinal groove or grooves, and a wire or wires inserted in the groove or grooves, with a cylindrical tube, perforated to receive the ends of a wire or wires, said tube having its upper portion closed by a cap, whereas the lower portion, terminating in the form of a perforated flange, is secured to said tire by layers of rubber and canvas, all substantially as set forth.

2. A tire-fastening device consisting of a tire, having a longitudinal groove or grooves, a wire or wires inserted in the groove or grooves, the ends of the wire or wires non-removably secured to the inside of a tube, by means of a plug or a corrugated cylinder, said tube having its flanged portion fastened to the tire by layers of rubber and canvas, for the purpose specified.

3. A tire-fastening device, consisting of a tire, having a longitudinal groove or grooves, wire or wires embedded in the groove or grooves, the ends of the wire or wires secured to a cylindrical tube, by means of a corrugated plug, said tube having a cap on its upper portion, while its lower portion, terminating in the form of a flange, is secured to the tire by layers of rubber and canvas, substantially as described.

Signed at Hoboken, in the county of Hudson and State of New Jersey, this 15th day of July, A. D. 1903.

JOHN T. DICKEY.
CARRY D. DERRY.

Witnesses:
 CECILIA M. TSCHINKEL,
 ANTONIO TSCHINKEL.